Jan. 25, 1966   W. G. HARRISON ETAL   3,231,066
TILTING CONVEYOR APPARATUS
Filed May 6, 1964                      3 Sheets-Sheet 2

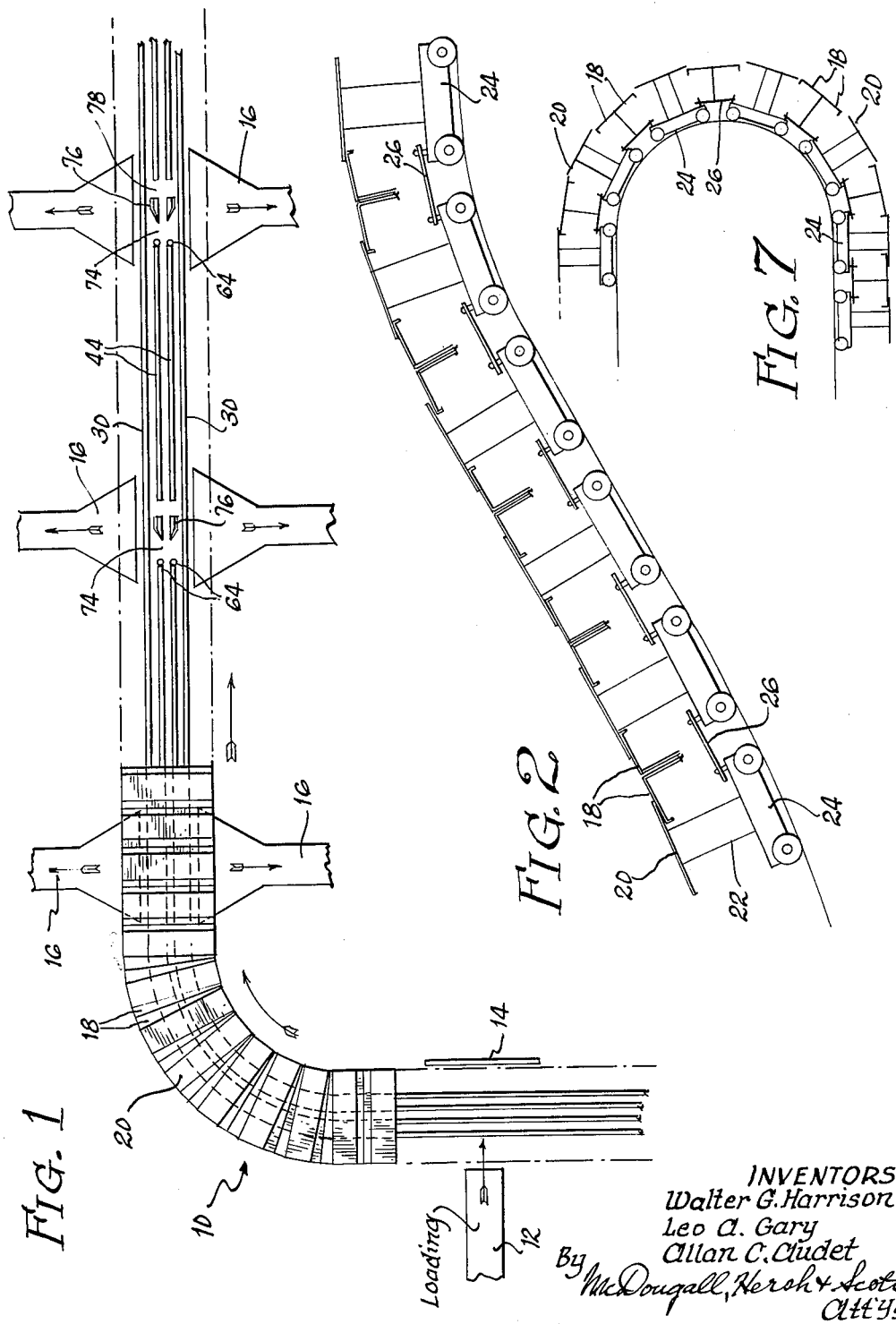

INVENTORS
Walter G. Harrison
Leo A. Gary
Allan C. Audet
By McDougall, Hersh & Scott
Att'ys

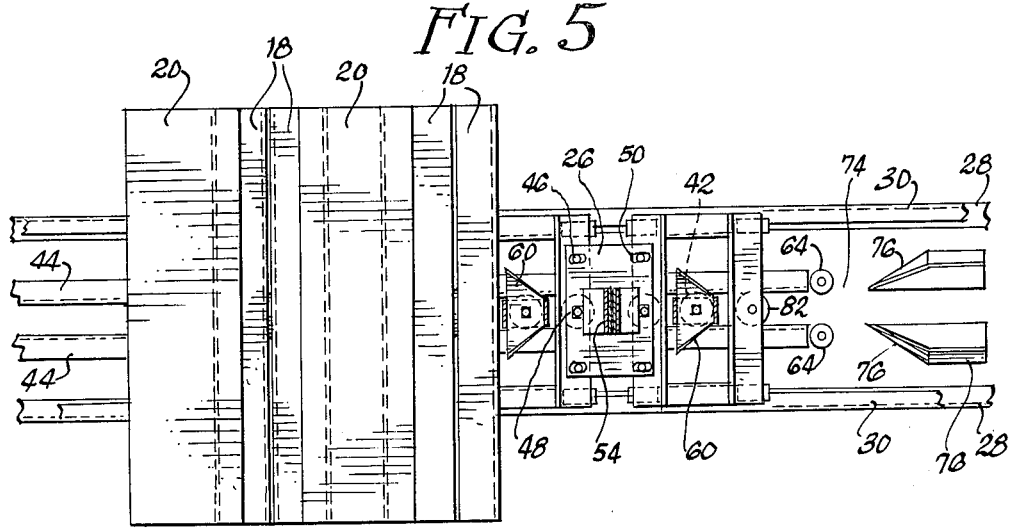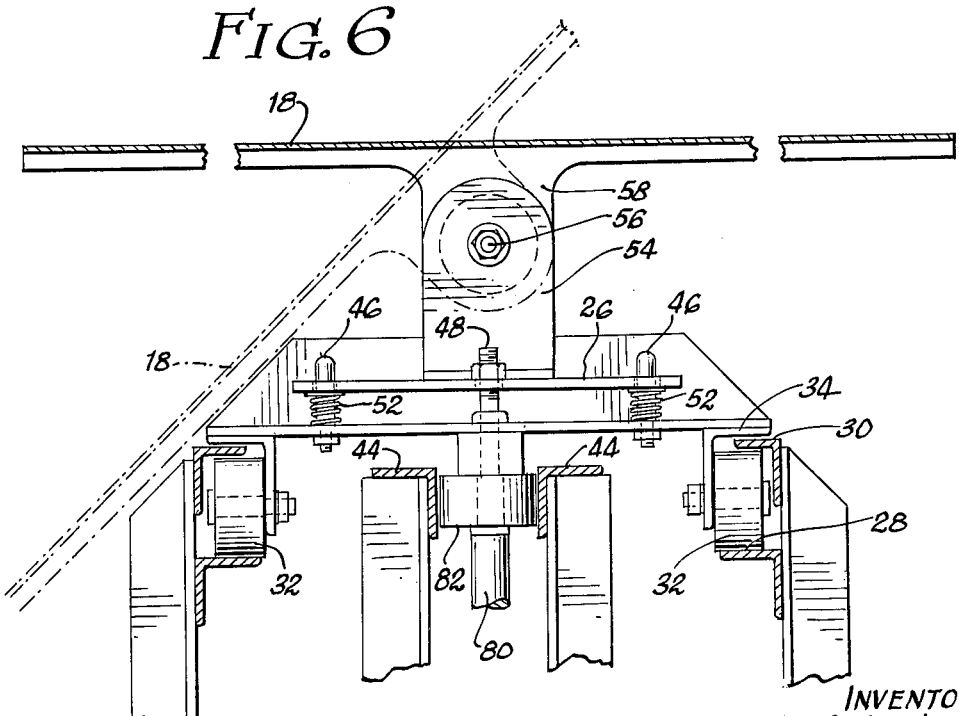

United States Patent Office 3,231,066
Patented Jan. 25, 1966

3,231,066
TILTING CONVEYOR APPARATUS
Walter G. Harrison, Westchester, Leo A. Gary, Chicago, and Allan C. Audet, Arlington Heights, Ill., assignors to Prospect Manufacturing Co. Inc., Chicago, Ill., a corporation of Illinois
Filed May 6, 1964, Ser. No. 365,361
14 Claims. (Cl. 198—155)

This invention relates to a conveyor apparatus. In particular, the invention is concerned with a conveyor mechanism employed for transporting articles along a predetermined path and for depositing the articles at any one of several preselected points along said path.

It is highly desirable to provide conveyor means which can be employed for selectively depositing articles at various points along the conveyor. For example, in operations involving the handling of large numbers of packages, it is often desirable to provide for sorting of the packages. It may be necessary to sort the packages in accordance with size considerations or, as in post office operations, the packages may be sorted depending on their particular destination.

A convenient manner for the sorting of packages and other articles involves the provision of bins or other collecting means situated at several points along a conveyor route. Articles are placed on the conveyor surface and means are provided for discharging the articles when the conveyor carries the article to a particular collecting location.

Suitable conveyor constructions of the type described are disclosed in applicants' copending application Serial No. 81,754, now Patent No. 3,167,192, entitled "Automatic Sortation System." In addition, the constructions illustrated in Speaker Patent No. 3,034,665 are designed to achieve operations of the type described.

Certain difficulties have, however, been experienced with known constructions. These difficulties relate principally to the size of the conveyor structures and to the versatility of the structures. Size factors are an important consideration since many constructions must be located where only limited space is available. Where the operating features of a conveyor construction prevent the efficient utilization of space, the structures lose a great deal of their appeal.

Known constructions also present difficulties due to the fact that they are limited in the type of path along which they can be maneuvered. Some constructions are not capable of movement around corners in a satisfactory manner, and movement from one horizontal plane to another is also difficult. Where such capabilities are encountered, the constructions comprise completely individual carrying trays with no contact between adjacent trays. The spaces between the trays comprise lost space and, therefore, a conveyor will not have the capacity of a conveyor having a continuous article carrying surface.

It is an object of this invention to provide a conveyor apparatus which is relatively compact in construction whereby the apparatus can be set up in locations having a minimum of available space.

It is an additional object of this invention to provide a conveyor apparatus of the type described which is extremely versatile in that the apparatus can easily turn corners and can easily carry articles from one horizontal plane to another.

It is a further object of this invention to provide an apparatus of the type described which can be employed in the manner of a continuous belt rather than being restricted to a closed circuit operation.

These and other objects of this invention will appear hereinafter, and for purposes of illustration, but not of limitation, specific embodiments of this invention are shown in the accompanying drawings in which:

FIGURE 1 is a fragmentary plan view of a conveyor apparatus of this invention;

FIGURE 2 is a schematic elevational view illustrating the apparatus moving from one plane to another;

FIGURE 5 is a plan view illustrating the details of the conveyor construction;

FIGURE 6 is a cross-sectional view taken about the line 6—6 of FIGURE 3; and,

FIGURE 7 is a schematic illustration of the conveyor designed to operate in the manner of an endless belt.

Figure 3:
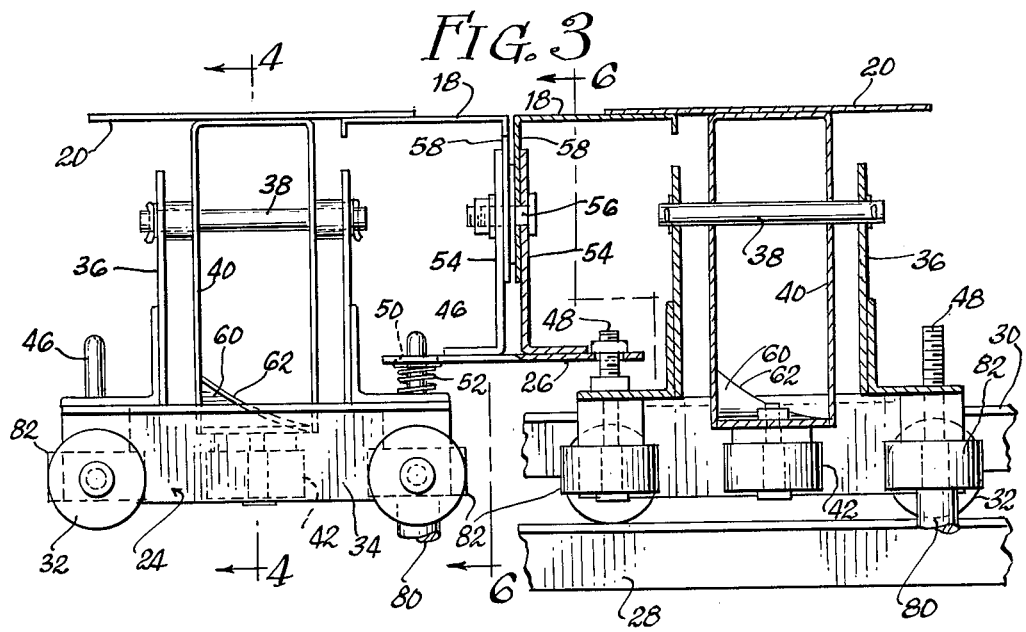
FIGURE 3 is a detail elevational view, partly in section, illustrating individual conveyor sections.

The conveyor apparatus of this invention is of a known type adapted to ride on track means including equivalent mechanisms capable of supporting and guiding the article carrying constructions. The track means are located along a predetermined path, and the article carrying structures are moved along this path by suitable drive means. Stations for the collecting of articles are situated at various locations whereby the path and means are provided for tilting the article carrying surfaces of the conveyor to provide for discharge of the articles. By properly regulating the operation of the tilting mechanisms, the articles can be sorted in accordance with any desired arrangement.

The instant invention is particularly concerned with the structures making up the article carrying surfaces. These structures include a plurality of first slat means having upper surfaces which define a portion of the bed of the conveyor apparatus. A plurality of second slat means define the remaining portions of the bed, and these second slat means are interposed between the first slat means throughout the conveyor construction.

Each of the slat means is individually pivotally mounted whereby the slat means can be tilted to discharge articles carried thereon. The leading and trailing edges of the second slat means are disposed in overlapping relationship with respect to the first slat means so that tilting of the second slat means will also result in tilting of the engaging first slat means. When the combination of first and second slat means is tilted, and when an article is carried by this combination, discharge of the article can be effected.

The accompanying drawings will provide an illustration of conveyor constructions characterized by the features of this invention. In FIGURE 1, there is illustrated a conveyor assembly 10 which is mounted for movement along a predetermined path. The conveyor moves past a loading station 12 where articles are adapted to be passed onto the conveyor. The loading station may comprise an endless belt which can be automatically operated for the placing of articles on the conveyor. A backstop member 14 may be employed for preventing articles from being thrown beyond the carrying surface of the conveyor.

A plurality of chutes 16 are located along the path of the conveyor on either side thereof. In a post office operation, the respective chutes will be provided for collecting packages or sacks destined for particular locations. As the conveyor moves past a particular chute, means are operated whereby the conveyor sections will tilt if they carry an article to be deposited at a particular chute.

FIGURE 2 provides a somewhat more detailed indication of the conveyor means of this invention. The article carrying surfaces are defined in the conveyor by first slat means 18 and second slat means 20. The slat means 20 are carried on supporting structures 22 which are connected to trucks 24. The trucks are interconnected by means of plates 26. As will be illustrated, mounts for pivotally supporting the slat means 18 are connected to these plates.

FIGURES 3 through 6 illustrate in more detail the mounting means for the respective slats. The trucks 24 are carried on tracks 28 and 30 which confine the wheels 32 of the trucks. Angle members 34 are attached to the trucks to form axle mounts for the wheels.

Forward and rearward mounting members 36 are fixed to the bed of each truck. These upstanding members define openings for receiving the rod 38. The rod 38 extends through the support member 40 which carries the slat means 20. With this arrangement, a pivotal mounting for the slat means is provided.

The lower end of the support member 40 carries a wheel 42 which rides between tracks 44. Accordingly, the slat means 20 is maintained in a horizontal position as long as the wheel 42 is confined by the tracks 44.

The plate means 26 which carries the slat means 18 is attached to the trucks by means of upstanding pins 46 and bolts 48. As best shown in FIGURE 5, the plate means 26 define over-size holes 50 whereby relative movement between the plate means and the trucks can be accomplished. In addition to the turning movement permitted by the arcuate slots 50, relative vertical movement between the plate means and the associated trucks can also be accomplished with the illustrated arrangement. Spring means 52 may be inserted around the bolts 48 and between the plate means and the truck bed to control movement between these members.

Upstanding members 54 are fixed to the plate means, and these members define openings for receiving pivot pin 56. Each of the slat means 18 includes a downwardly depending portion 58 which also define openings for receipt of the pivot pin. With this arrangement, adjacent ones of the slat means are individually pivotally mounted in the construction. It will be apparent that pivoting of any of the slat means will result in pivoting of an entire combination connected to the pivoted slat. Thus, a combination of a slat means 20 and slat means 18 on either side thereof will all be pivoted simultaneously as a result of a tilting operation. The overlapping arrangement between the leading and trailing edges of the slat means 20 and the adjacent edges of the slat means 18 provide such action in the illustrated arrangement.

In the embodiment shown, tilting action is achieved through action of cam means engaging the support 40 for the slat means 20. It will be noted that this support member defines curved wing means 60 extending outwardly on either side of the support. These wings define cam edges 62. A cam roller 64 is normally situated in the position illustrated in FIGURE 4. These rollers are normally out of the path of movement of the edges 62 and, accordingly, they do not normally operate during movement of the conveyor apparatus.

The rollers 64 are mounted on a vertical member 66 which is connected to pivot arm 68. This arm is in turn connected to the core extension 70 of solenoid 72. When the solenoid is energized, the member 66 will be moved upwardly to force the wheel 64 into the path of movement of the cam edge 62. Engagement of this wheel with the cam edge will cause pivoting of the slat 20 as illustrated in dotted lines in FIGURE 4. As previously explained, pivoting of this slat means will result in pivoting of the slat means 18 which overlap its leading and trailing edges. A corresponding member 66 is located on the opposite side of the conveyor so that the slat means can be tilted in either direction.

Figure 4:
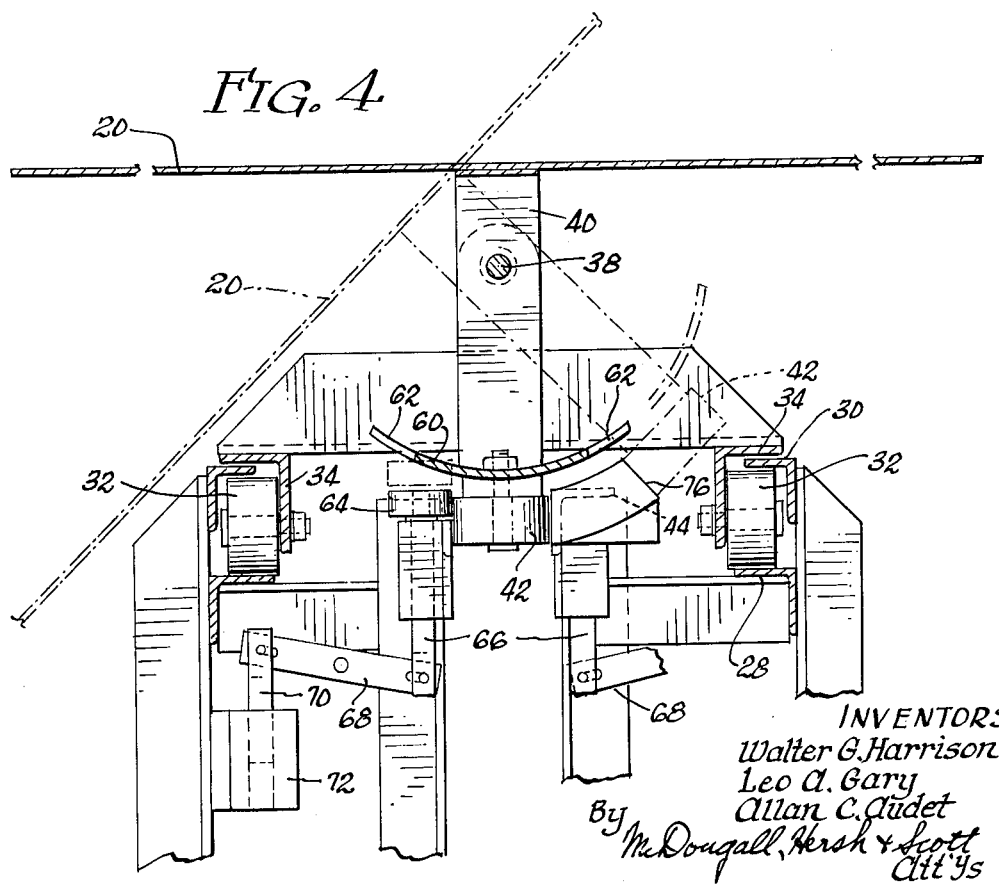
FIGURE 4 is a cross-sectional view taken about the line 4—4 of FIGURE 3.

FIGURES 1 and 5 illustrate the manner in which the solenoid operation can effect tilting of the slat means in the over-all conveyor construction. It will be noted that the tracks 44 define gaps 74 in positions adjacent the chutes 16. The cam wheels 64 are located in these gaps so that energization of a solenoid 72 will result in engagement of the cam wheel with the wings 60 when the wheel 42 is free of contact with the tracks 44. Tilting of the slat means as illustrated in FIGURES 4 and 6 can then be accomplished.

Located beyond the gaps 74, there are provided tracks 76 which contact the wheel 42 when this wheel has been moved outwardly. The tracks 76 thus serve to maintain the combination in a tilted position for a desired period to insure removal of articles carried.

Beyond the tracks 76, there is an additional gap 78 which may be utilized for restoring the slat means to a normal position. This can be accomplished by providing springs in association with the slat means so that they will be normally biased to horizontal position. It is also contemplated that restoring cams could be included in this area to cause the slat means to pivot into the normal position. It will be understood, however, that the slat means could be carried by the conveyor in a tilted position, the restoring operation taking place just prior to the loading zone.

The conveyor structures of this invention are advantageously utilized with known control systems providing for the tilting of the trays. For example, systems of the type described in the aforementioned copending application or in the Speaker patent are contemplated. In such systems, a code is assigned to each article at the loading zone. As the conveyor moves and the article progresses towards its destination, the control systems operate whereby the proper solenoid 72 will be energized at the time that the particular article is adjacent its destination. It will be apparent, however, that the instant invention is directed to the conveyor apparatus, and that automatic control means need not be employed to achieve the desired results. Thus, each of the solenoids could be connected to a pushbutton switch which could be manually operated at a desired moment. An operator could simply watch the conveyor system to determine the proper time for energization of a particular solenoid.

The movement of the trucks carrying the slat means can be accomplished in a variety of ways. For example, a drive chain could be connected to pins 80 which extend downwardly from wheels 82 associated with the trucks. The wheels 82 also ride on the tracks 44, however, they are not pivotable relative to the trucks 24. It will be apparent that other means for propelling the conveyor apparatus could be easily employed.

FIGURES 1, 2 and 7 illustrate the versatility of the described construction. The apparatus can be easily employed for a closed circuit type conveyor wherein turning of corners is necessary. The surfaces of the slat means described permits such turning without in any way disrupting the continuous conveyor surface.

A similar condition exists where the conveyor moves from one horizontal level to another. The slat means remain in engagement with each other so that discontinuities in the conveyor surface will not result. FIGURE 7 illustrates the adaptability of the construction to an endless belt type arrangement. The provision of relative vertical and horizontal movement of the plate 26 with respect to the bolts 48 and pins 46 is responsible for the versatile character of the apparatus. This connecting arrangement along with the arcuate slots 50 also enables any given apparatus to combine the various movements described.

One distinct advantage of the apparatus of this invention concerns its relatively compact character. A large surface area is provided for a relatively small length since the carrying surface is continuous. Thus, the invention combines the advantages of a belt type conveyor with conveyors having tiltable carriages. Furthermore, the height of the mechanisms is relatively small, this being due to the uncomplicated character of the structural elements involved.

It will be understood that various changes and modifications may be made in the above described apparatus which provide the characteristics of this invention without departing from the spirit thereof particularly as defined in the following claims.

That which is claimed is:

1. In a conveyor apparatus adapted to ride on track means located along a predetermined path, said apparatus including carriage means for holding articles to be conveyed and means disposed along said path adapted to tilt said carriage means for discharging said articles, the improvement in said carriage means comprising a plurality of first slat means having upper surfaces defining a portion of the bed of said carriage means, and a plurality of second slat means having upper surfaces defining the remaining portions of said bed, said first slat means being individually pivotally mounted in said apparatus whereby said first slat means can be tilted transversely of said path and whereby individual ones of said first slat means can be tilted relative to each other, said second slat means being pivotally mounted whereby they can be tilted transversely of said path, the leading and trailing edges of said second slat means being disposed in overlapping relationship with adjacent first slat means, said means for tilting the carriage means comprising means adapted to selectively engage at least one slat means in a combination comprising first and second slat means whereby said combination can tilt to discharge articles carried on said bed.

2. An apparatus in accordance with claim 1 wherein said first means are situated in pairs, and wherein said second slat means are located between adjacent pairs of said first slat means whereby the combination of slat means forms a substantially uninterrupted bed for carrying said articles.

3. An apparatus in accordance with claim 1 wherein said carriage means are adapted to travel along curvilinear paths in a horizontal plane and are adapted to deviate from said horizontal plane.

4. An apparatus in accordance with claim 1 including tracks defining bearing surfaces, wheels associated with said second slat means for engagement with said tracks, and gaps defined by said tracks whereby said wheels are adapted to separate from said tracks when tilting occurs.

5. In a conveyor apparatus adapted to ride on track means located along a predetermined path, said apparatus including carriage means for holding articles to be conveyed and means disposed along said path adapted to tilt said carriage means for discharging said articles, the improvement in said carriage means comprising a plurality of first slat members, each of said slat members comprising a generally horizontal portion defining a portion of the bed of said carriage means, and each slat means including a downwardly depending portion, plate means, said downwardly depending portions being individually pivotally connected with said plate means whereby said slat means are adapted to be tilted transversely of said path and whereby said slat means are adapted to be tilted relative to each other, and a plurality of second slat means having upper surfaces defining the remaining portions of said bed, said second slat means being pivotally mounted whereby they can be tilted transversely of said path, the leading and trailing edges of said second slat means being disposed in overlapping relationship with adjacent first slat means, said means for tilting the carriage means comprising means adapted to selectively engage at least one slat means in a combination comprising first and second slat means whereby said combination can tilt to discharge articles carried on said bed.

6. An apparatus in accordance with claim 5 wherein said second slat means are mounted on upstanding support members and wherein said members are mounted on wheeled trucks, and including tracks defining bearing surfaces for carrying said trucks, a wheel mounted on each support member, and an additional track for supporting said last mentioned wheels, and including gaps defined by said additional track whereby the wheels riding on said additional track are adapted to be separated from said track when said tilting occurs.

7. An apparatus in accordance with claim 6 wherein said support means carry outwardly directed portions defining cam surfaces, and means associated with said apparatus adapted to be selectively interposed in the path of said cam surfaces for engagement with said surfaces as they move with said carriage means, the resulting camming action causing tilting of said carriage means.

8. An apparatus in accordance with claim 7 wherein said cam surfaces are on both sides of said support means, and wherein said means for engaging said cam surfaces are located on both sides of said second slat means whereby said second slat means is adapted to be tilted in either direction.

9. An apparatus in accordance with claim 6 including plate means connected to respective forward and rearward ends of adjacent trucks.

10. An apparatus in accordance with claim 9 wherein each of said plate means is pivotally connected to said trucks whereby the line of trucks and plate means is adapted to pivot in a horizontal plane so that said apparatus can turn corners.

11. An apparatus in accordance with claim 9 wherein the connections between said trucks and said plate means provide for freedom of vertical movement whereby the slat means can bend relative to each other in vertical directions as said apparatus is moved uphill or downhill.

12. An apparatus in accordance with claim 5 including an uneven gripping surface formed on said slat means whereby articles are inhibited from sliding over the surfaces of said slat means.

13. An apparatus in accordance with claim 5 wherein said carriage means are moved along a closed circuit.

14. An apparatus in accordance with claim 5 wherein the path of movement of said carriage means is in the form of an endless belt movement.

No references cited.

SAMUEL F. COLEMAN, *Primary Examiner.*